US008564423B2

(12) United States Patent
Nichols et al.

(10) Patent No.: US 8,564,423 B2
(45) Date of Patent: Oct. 22, 2013

(54) COLLISION SEVERITY BASED ACTIVATION OF A PEDESTRIAN PROTECTION DEVICE

(75) Inventors: David J. Nichols, Carmel, IN (US); Russell L. Simpson, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 657 days.

(21) Appl. No.: 12/838,086

(22) Filed: Jul. 16, 2010

(65) Prior Publication Data

US 2011/0043344 A1 Feb. 24, 2011

Related U.S. Application Data

(60) Provisional application No. 61/235,511, filed on Aug. 20, 2009.

(51) Int. Cl.
*B60Q 1/00* (2006.01)
*G08G 1/16* (2006.01)
*G08G 1/07* (2006.01)
*G08G 1/095* (2006.01)
*B60R 22/00* (2006.01)
*B60K 28/10* (2006.01)

(52) U.S. Cl.
USPC .......... 340/436; 340/903; 340/435; 340/944; 340/925; 701/45; 180/274

(58) Field of Classification Search
USPC ............ 340/436, 903, 435, 944, 925; 701/45; 180/274
See application file for complete search history.

(56) References Cited

U.S. PATENT DOCUMENTS

| 6,327,527 | B1 | 12/2001 | Imai et al. | |
|---|---|---|---|---|
| 6,701,238 | B2 | 3/2004 | McConnell | |
| 6,898,498 | B1 | 5/2005 | Wessels et al. | |
| 7,424,354 | B2 | 9/2008 | Shen | |
| 2006/0231321 | A1* | 10/2006 | Takahashi | 180/274 |
| 2009/0020353 | A1* | 1/2009 | Kiribayashi | 180/274 |
| 2009/0276112 | A1* | 11/2009 | Mack | 701/29 |
| 2009/0312949 | A1* | 12/2009 | Suzuki et al. | 701/301 |
| 2009/0322107 | A1* | 12/2009 | Takahashi et al. | 293/121 |
| 2010/0017068 | A1* | 1/2010 | Rauh et al. | 701/47 |
| 2010/0030433 | A1* | 2/2010 | Suzuki | 701/45 |
| 2010/0300792 | A1* | 12/2010 | Yuan et al. | 180/274 |
| 2011/0015829 | A1* | 1/2011 | Mack et al. | 701/47 |

FOREIGN PATENT DOCUMENTS

| EP | 1731375 | 12/2006 |
|---|---|---|
| JP | 2006-341843 | 12/2006 |
| WO | WO2006/072480 | * 7/2006 |
| WO | WO2008/019914 | * 2/2008 |
| WO | WO2008/034671 | * 3/2008 |

* cited by examiner

*Primary Examiner* — George A Bugg
*Assistant Examiner* — Jack K Wang
(74) *Attorney, Agent, or Firm* — Lawrence D. Hazelton

(57) ABSTRACT

A method and a system on a vehicle for activating a pedestrian protection device that has one or more sensors coupled to a fascia of the vehicle and activates the pedestrian protection device if the signal from a sensor is greater than a minimum threshold and less than a maximum threshold. Coupling the one or more sensors to the fascia improves sensitivity for detecting a collision with a pedestrian when compared to systems that do not couple the sensors to the fascia. Comparing the sensor signal to a minimum threshold and a maximum threshold helps avoid inappropriate or ineffective deployment of the pedestrian protection device. When multiple sensors are used, the location of the pedestrian collision on the fascia may be determined.

9 Claims, 2 Drawing Sheets

US 8,564,423 B2

COLLISION SEVERITY BASED ACTIVATION OF A PEDESTRIAN PROTECTION DEVICE

CROSS-REFERENCE TO RELATED APPLICATION

This application claims the benefit under 35 U.S.C. §119(e) of U.S. Provisional Patent Application No. 61/235,511, filed Aug. 20, 2009, the entire disclosure of which is hereby incorporated herein by reference.

TECHNICAL FIELD OF INVENTION

The invention generally relates to vehicle safety systems, and more particularly relates to a system for detecting a collision with a pedestrian for activating a pedestrian protection device.

BACKGROUND OF INVENTION

It has been proposed to equip the front of vehicles with devices for protecting a pedestrian if the vehicle and the pedestrian collide. Some vehicles have vehicle collision detection systems with sensors mounted in the forward portion of the vehicle. However, while such arrangements may be satisfactory for vehicle collisions with 'hard' objects such as other vehicles, trees, and concrete structures, the arrangement may have insufficient or improper sensitivity, and/or an undesirable time delay to be used to detect a collision with a pedestrian and to properly and timely activate the pedestrian protection devices. Furthermore, signals from the sensors need to be analyzed to distinguish collisions with pedestrians from collisions with hard object as described above, and with objects smaller than pedestrians such as birds, so that pedestrian protection devices are not inappropriately deployed.

SUMMARY OF THE INVENTION

In accordance with one embodiment of the present invention, a system on a vehicle for activating a pedestrian protection device is provided. The system includes a first sensor, a second sensor, and a controller. The first sensor is coupled to a fascia of the vehicle and is adapted to detect a collision with an object and output a first signal. The second sensor coupled to the fascia spaced apart from the first sensor. The second sensor is also adapted to detect a collision with an object and output a second signal. The controller is configured to receive the first signal from the first sensor and the second signal from the second sensor. The controller is also configured to determine a minimum threshold set and a maximum threshold set based on the first signal and the second signal. The controller is further configured to activate the pedestrian protection device if either the first signal or the second signal is greater than a threshold of the minimum threshold set and less than a threshold of the maximum threshold set.

In yet another embodiment of the present invention, a method for activating a pedestrian protection device on a vehicle is provided. The method includes the step of receiving a first signal from a first sensor that is coupled to a fascia of the vehicle and is adapted to detect a collision with an object. The method also includes the steps of determining if the first signal is indicative of a collision with a pedestrian and activating the pedestrian protection device based on the determination that the first signal is indicative of a collision with a pedestrian.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
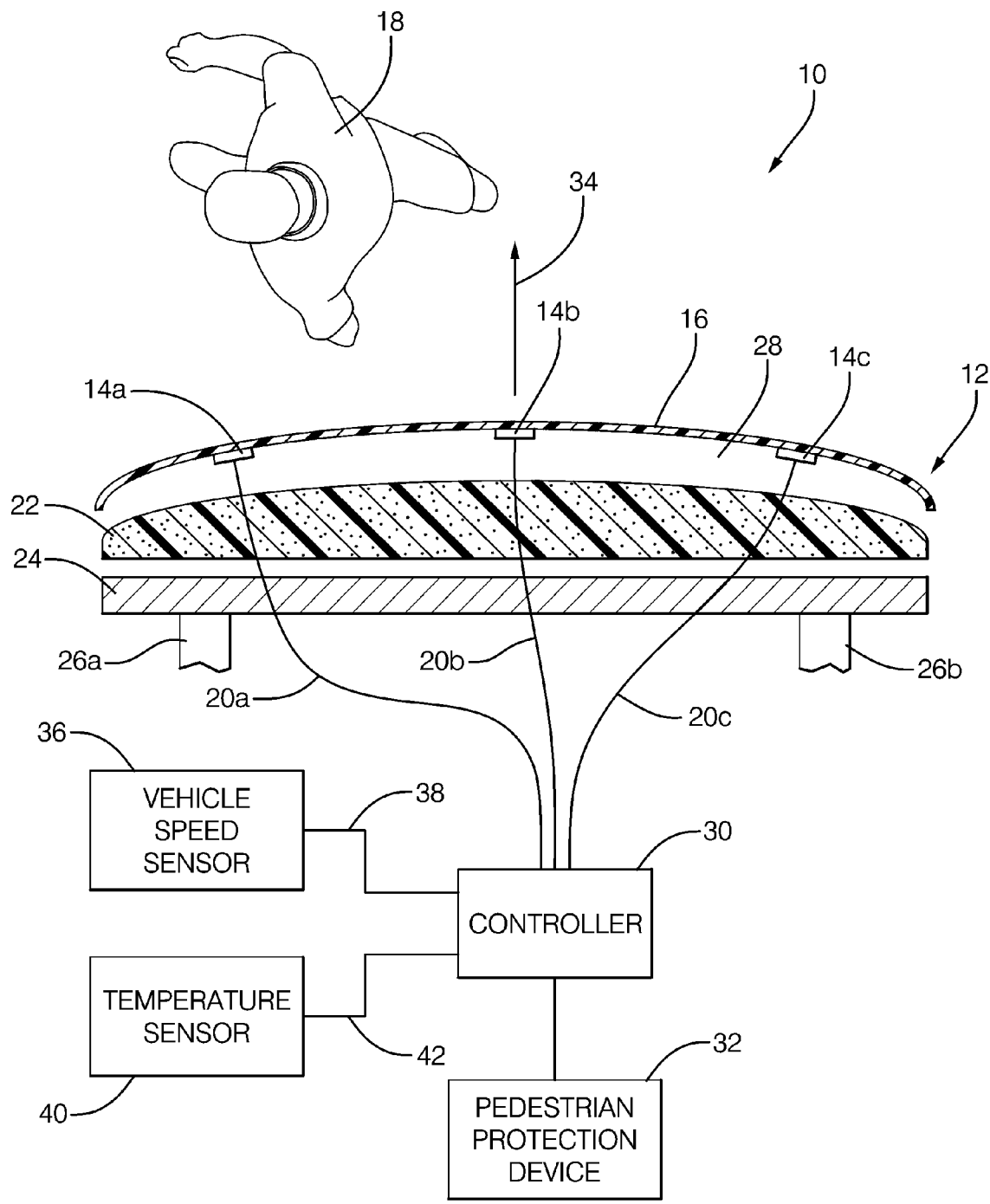
FIG. 1 is a diagram of a system on a vehicle for activating a pedestrian protection device in accordance with one embodiment.

In accordance with an embodiment of a system on a vehicle for activating a pedestrian protection device, FIG. 1 illustrates a system 10 that includes a bumper assembly 12 of a vehicle (not shown) such as a front bumper assembly of an automobile. The system 10 includes a first sensor 14A coupled to a fascia 16 of the vehicle. As used herein, characterizing a sensor as being coupled to the fascia 16 means that the sensor is arranged with a bumper assembly 12 such that an impact with the fascia 16 by an object may be readily detected by the sensor. The first sensor 14A may be adapted to detect a collision with an object, particularly an object having physical characteristics similar to a pedestrian 18 illustrated in FIG. 1. The first sensor 14A, or other sensors illustrated, may be accelerometer type sensors, displacement type sensors or any other sensor useful for determining acceleration, velocity, or displacement of the fascia 16, or impact with the fascia. FIG. 1 illustrates that the bumper assembly 12 is moving toward the pedestrian 18 and so a collision has not yet occurred, but is imminent. The first sensor 14A may also be configured to output a first signal 20A indicated by a line in FIG. 1. The first signal 20A may be a voltage, digital signal, or other signal format capable of indicating that something is impinging on the fascia 16.

As used herein, the fascia 16 is, in general, a flexible membrane that provides a decorative cover for other parts of the bumper assembly 12, such as an impact spreading device 22, and/or a rigid bumper 24 attached to vehicle frame members 26A and 26B. The fascia 16 is typically not tightly coupled to the underlying impact spreading device 22, and so at least a portion of the fascia 16 may be separated from the underlying structure by an air gap 28. FIG. 1 illustrates a non-limiting example of one or more sensors 14A, 14B, 14C directly attached to the back side of the fascia 16. By attaching the first sensor 14A to a region of the fascia 16 that is spaced apart from the underlying structure by an air gap 28, the first sensor 14A is readily displaced relative to the underlying structure by an object impinging on the fascia 16, and so the first sensor 14A may be better positioned to detect the impingement. Alternately, the space between fascia 16 and the impact spreading device 22 may include an easily deformed material such as compressible foam. Also, it will be appreciated that the first sensor 14A, or other sensors, may be attached or mounted elsewhere in or near the bumper assembly 12, such as attached to the steel bumper 24, and still be effective to detect an impact of the fascia 16 with the pedestrian 18. The first sensor 14A may be, but is not limited to, an accelerometer type sensor configured to output an indication of acceleration for the first signal 20A. Alternately, first sensor 14A may be a displacement detecting device that determines, for example, a distance from the first sensor 14A to the impact spreading device 22 or the rigid bumper 24, and so may output a first signal 20A indicative of a distance or a displacement. Typically, sensors for vehicle collision detection systems are mounted in the area of a vehicle radiator such as on an upper or lower radiator tie bar or frame rails and so are, in general, not coupled to the fascia 16 and thus not well suited for detecting a collision with the pedestrian 18. By moving the first sensor 14A closer to where the pedestrian 18 would make contact in the event of a collision, the system 10 may be able to detect the onset of a collision event with the pedestrian 18 earlier, and so may be able to respond earlier during the collision event. Furthermore, since the fascia 16 is generally flexible and not tightly coupled to the underlying impact spreading device 22, and/or rigid bumper 24, the fascia 16 is easily deformed by contact with the pedestrian 18 and so the first sensor 14A may be more sensitive to any deformation of the fascia 16. The fascia 16 may be formed as a single piece, or may include two or more sections arranged to form the fascia 16.

The system 10 may also include a controller 30 configured to receive the first signal 20A from the first sensor 14A and adapted to activate a pedestrian protection device 32 if the first signal 20A is indicative of a collision with a pedestrian. The controller 30 may include a processor such as a microprocessor or other control circuitry as should be evident to those in the art. The controller 30 may include memory, including non-volatile memory, such as electrically erasable programmable read-only memory (EEPROM) for storing one or more routines, thresholds and captured data. The one or more routines may be executed by the processor to perform steps for determining if signals received by the controller 30 are indicative of a collision with a pedestrian as described herein. The pedestrian protection device 32 may be one or more of known pedestrian protection devices such as one or more air bags activated in a forward direction corresponding to a direction of travel arrow 34, or may be one or more actuators that move portions or sections of the vehicle's body such as moving the vehicle's hood in a manner directed to protecting the pedestrian 18 during a collision event.

In one embodiment, the controller 30 may be configured to activate the pedestrian protection device 32 if the first signal 20A is greater than a first threshold and less than a second threshold. It will be understood that the value of the first threshold is necessarily less than the value of the second threshold. By having a lower first threshold, collisions with small objects such as stones or birds will generally result in relatively small signal values that are less than the first threshold, and the first signal 20A will not indicate a collision with a pedestrian 18, and so the controller 30 will not unnecessarily activate or deploy the pedestrian protection device 32. Likewise, collisions with hard objects such as other vehicles or concrete abutments will generate relatively large signal values, and so the first signal 20A will not indicate a collision with a pedestrian 18. If the first signal 20A is either too small or too large, the controller 30 will not unnecessarily activate or deploy the pedestrian protection device 32.

The speed of the vehicle at the onset of a collision with a pedestrian 18 may influence the first sensor signal 20A. For example, during a collision event, the position of the pedestrian 18 may be changed more readily than the position of a tree when impacted by the bumper assembly 12. As such, for a given vehicle speed, a collision with a pedestrian or a tree may be distinguished by analyzing one or more characteristics of the first sensor signal 20A to determine if the object being collided with is being moved by the collision. The vehicle speed may influence the rate at which the pedestrian 18 is accelerated, and so may influence the first sensor signal 20 differently for different vehicle speeds. Therefore, it may be advantageous for the controller 30 to be configured to determine, at least in part, the first threshold and the second threshold based on a vehicle speed. To this end, the system 10 may include a vehicle speed sensor 36 configured to output a vehicle speed signal 38 indicated by a line in FIG. 1.

The temperature of the fascia 16 may affect the stiffness of the fascia 16 or underlying material in the air gap 28 of the bumper assembly 12, and this may influence the first sensor signal 20 for a given collision event. For example, if at cold temperatures the fascia becomes stiffer, the first sensor signal 20 arising from a collision with a pedestrian 18 may be decreased. The decreased signal may be erroneously interpreted by the controller 30 as a collision is with something smaller than the pedestrian 18, and so the controller 30 may not activate the pedestrian protection device 32. It may be advantageous for the controller 30 to be configured to determine, at least in part, the first threshold and the second threshold based an ambient temperature. To this end, the system 10 may include a temperature sensor 40 configured to output a temperature signal 42 indicated by a line in FIG. 1.

Due to the flexible nature of the fascia 16, the performance of the system 10 may be improved by having more that one sensor (e.g.-first sensor 14A) so collisions with any area of the fascia 16 may be more reliably detected. As such, the system 10 may include a second sensor 14B, and/or a third sensor 14C and/or other sensors (not shown) attached to a fascia 16 of the vehicle spaced apart from the first sensor 14A. The second sensor 14B and/or the third sensor 14C may be adapted to detect a collision with an object such as the pedestrian 18, and output a second signal 20B and a third signal 20C respectively. It follows that the controller 30 may be configured to receive the second signal 20B from the second sensor 14B, and/or the third signal 20C from the third sensor 14C. The first threshold and the second threshold described above may be suitable for a system 10 with a single sensor, or for when the signals 20A-C are individually analyzed. However, if the signals 20A-C are combined, or otherwise analyzed to estimate where an object is impinging the fascia 16, and the severity of that impingement, it may be advantageous to designate one sensor as a primary sensor, such as the sensor indicating the greatest magnitude signal, and another sensor as a secondary sensor, such as the sensor indicating the second greatest magnitude signal. It may also be advantageous to determine a third threshold and a forth threshold based on a primary signal from the primary sensor and a secondary signal from the secondary sensor. For example, if the first signal 20A and the second signal 20B are about equal, the fascia 16 may be contacting a pedestrian 18 at a point about mid-way between the first sensor 14A and the second sensor 14B, and so a third and forth threshold lower than the first threshold and the second threshold respectively may be suitable to determine if a collision with a pedestrian has occurred and if the pedestrian protection device should be activated.

In this instance, the controller 30 may activate the pedestrian protection device 32 if either the first signal 20A or the second signal 20B is greater than the third threshold and less than the forth threshold. It will be appreciated that if one of the signals is substantially greater than the other signal(s), then the signals 20A-C may indicate that a pedestrian 18 is contacting the fascia 16 at a point that is closer to one of the sensors than the others. In this case, the first threshold and the second threshold may be suitable, or different thresholds may be determined based on various ratios of various characteristics of the signals 20A-C.

In one embodiment, the system 10 may include a first sensor 14A attached to the fascia 16 of the vehicle (not shown) that is adapted to detect a collision with an object such as a pedestrian 18 and output a first signal 20A, and include a second sensor 14B attached to the fascia 16 of the vehicle spaced apart from the first sensor 14A. The second sensor 14B may also be adapted to detect a collision with an object such as a pedestrian 18 and output a second signal 20B. The controller 30 for this embodiment may be configured to receive the first signal 20A from the first sensor 14A, and the second signal 20B from the second sensor 14B, and determine a minimum threshold and a maximum threshold based on the first signal 20A, and the second signal 20B. The controller 30 may also be configured to activate the pedestrian protection device 32 if either the first signal 20A or the second signal 20B is greater than the minimum threshold and less than the maximum threshold.

The minimum threshold and the maximum threshold may be selected to correspond to the first and second thresholds respectively, or the third and forth thresholds respectively, or some other pair of thresholds, depending on an analysis of the first and second signals 20A-B. In one embodiment, the minimum threshold and the maximum threshold may be selected based on a difference between some aspect of the first signal 20A and the second signal 20B. For example, if the difference is relatively large, for example greater than a calibrated difference threshold, it may indicate that the point of impingement on the fascia 16 is substantially closer to one of the sensors, and so the minimum and maximum thresholds may be selected based on the first and second thresholds, respectively. However, if the difference is relatively small, for example less than the calibrated difference threshold, it may indicate that the point of impingement is substantially between the sensors 14A-B, and so the minimum and maximum thresholds should be selected based on the third and fourth thresholds, respectively. In another embodiment, the minimum threshold and the maximum threshold may be selected based on a ratio of some aspect the primary signal and the secondary signal. By way of a non-limiting example, a first maximum acceleration value indicated by the first signal 20A may be designated as the primary signal and a second maximum acceleration value indicated by the second signal 20B may be designated as the secondary signal. The primary and secondary signals may be used to calculate a ratio of the secondary signal over the primary signal. If the ratio is not substantially equal to one (1.0), for example less than 0.5, the ratio may indicate that the point of impingement on the fascia 16 is closer to primary sensor that the secondary sensor, and so the minimum and maximum thresholds should be selected based on the first and second thresholds, respectively. However, if the ratio is substantially equal to one (1.0), for example between 0.5 and 1.0, the ratio may indicate that the point of impingement is closer to half-way between the sensors 14A-B, and so the minimum and maximum thresholds should be selected based on the third and fourth thresholds, respectively. The controller 30 may also be configured to further determine or adjust the minimum threshold and the maximum threshold based also on a vehicle speed and/or an ambient temperature as describe above with regard to the vehicle speed signal 38 and the temperature signal 42.

The signals 20A-C may be analyzed to determine a variety of characteristics such as acceleration, velocity, or displacement. As such, the controller 30 may be further configured to determine a first acceleration value, a first velocity value, and a first displacement value based on the first signal 20A, and determine a second acceleration value, a second velocity value, and a second displacement value based on the second signal 20B. The selection of a minimum threshold and a maximum threshold described now becomes selecting a minimum threshold set and a maximum threshold set having thresholds that correspond to one or more of the acceleration, velocity, and displacement characteristics determined above. As used herein, a threshold set is a collection of one or more thresholds that correspond to characteristics of sensor signals such as acceleration, velocity, and displacement. To select a threshold set, the controller 30 may be configured to compare a characteristic of the first signal 20A and the second signal 20B and designate one sensor as the primary sensor and one sensor as the secondary sensor. By way of an example, if the first sensor displacement value is greater than the second sensor displacement value, then the first sensor 14A may be designated as a primary sensor, and the second sensor 14B may be designated a secondary sensor.

It follows then, for this example, that the first acceleration value may be designated as a primary acceleration value, the first displacement value may be designated as a primary displacement value, and the first velocity value is designated as a primary velocity value. It also follows then that the second sensor may be designated as a secondary sensor, the second acceleration value may be designated as a secondary acceleration value, the second displacement value may be designated as a secondary displacement value, and the second velocity value may be designated as a secondary velocity value. Contrariwise, if the first sensor displacement value is less than or equal to the second sensor displacement value, then the first sensor is designated as a secondary sensor, the first acceleration value is designated as a secondary acceleration value, the first displacement value is designated as a secondary displacement value, the first velocity value is designated as a secondary velocity value, the second sensor is designated as a primary sensor, the second acceleration value is designated as a primary acceleration value, the second displacement value is designated as a primary displacement value, and the second velocity value is designated as a primary velocity value. In general, each signal 20A-C may be analyzed to determine one or more characteristic values. Each of the characteristic values may be compared to a minimum characteristic threshold value, a maximum characteristic threshold value, or compared to the characteristic value of another signal to determine if the pedestrian protection device 32 should be activated. As discussed herein, if a signal such as first signal 20A is described as being greater or less than some threshold, it understood that it is one or more of the various characteristic values (e.g.—acceleration, velocity, and displacement) associated with the first signal 20A that is being compared to the threshold.

Some or all of the characteristics listed above may be used to determine if a collision with a pedestrian is occurring and if the pedestrian protection device should be activated. By way of a non-limiting example, the controller 30 may be further configured to activate the pedestrian protection device when the primary sensor acceleration value is greater than a primary minimum acceleration threshold, the primary sensor acceleration value is less than a primary maximum acceleration threshold, the primary sensor velocity value is greater than a primary minimum velocity threshold, the primary sensor displacement value is greater than a primary minimum displacement threshold, the secondary sensor acceleration value is greater than a secondary minimum acceleration threshold, and the primary sensor acceleration value is greater than the secondary acceleration value.

Figure 2:
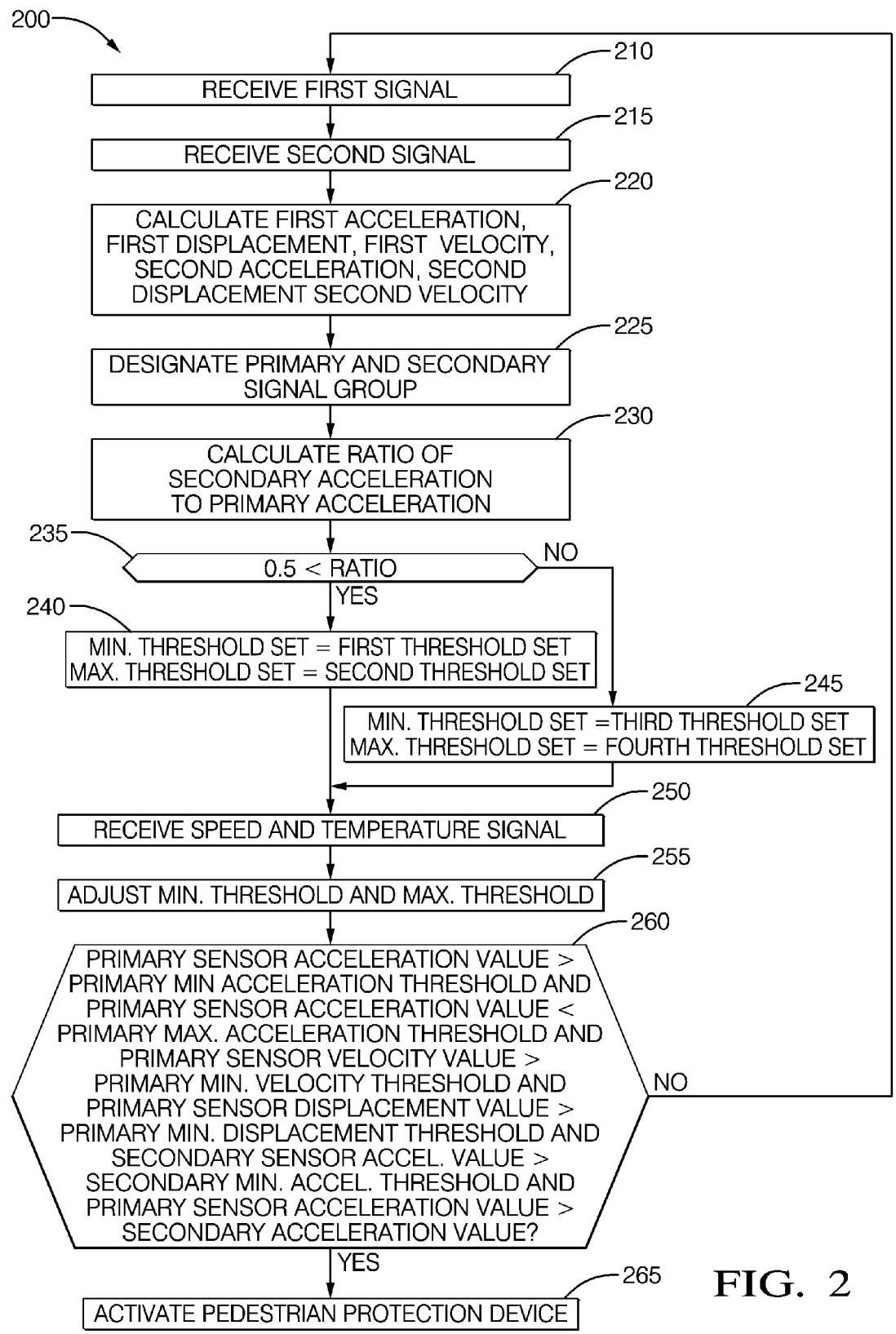
FIG. 2 is flowchart of a method for activating the pedestrian protection device of FIG. 1, in accordance with one embodiment.

FIG. 2 illustrates a flowchart of a routine or method 200 for activating the pedestrian protection device 32 in a vehicle. While not specifically shown, the method 200 may include providing one or more sensors (e.g. 14A-C) suitable for detecting a collision with a pedestrian 18. These one or more sensors may be attached or coupled to the fascia 16 of the vehicle to increase sensitivity and reduce time delay of the one or more sensors as compared to similar sensors mounted elsewhere in the vehicle. At step 210, a first signal 20A may be received by the controller 30 from the first sensor 14A attached to a fascia 16 of the vehicle and adapted to detect a collision with an object, in particular, the pedestrian 18.

By way of an example, if only one sensor was being used such that the first signal 20A was the only signal received, or if the signal from the first sensor 14A is substantially greater than the other sensors indicating that the point of impact is at or near the first sensor 14A, the first sensor 20A may be designated as the primary sensor. For the case of a single sensor, the method 200 may skip steps 230 and 235, and jump to step 240 where the signal thresholds (first and second thresholds) are determined, followed by determining if the first signal 20A is indicative of a collision with a pedestrian 18 based on a comparison of the first signal 20A characteristics to those thresholds of a minimum threshold set and a maximum threshold set. If, for example, the first signal 20A is greater than a first threshold and less than a second threshold, the first signal may be indicative of a collision with a pedestrian, and so the pedestrian protection device 32 may be activated as illustrated in step 265. If more than one sensor is being used, such as two sensors for example, then at step 215, a second signal 20B may be received by the controller 30 from the second sensor 14B attached to a fascia 16 of the vehicle and also adapted to detect a collision with the pedestrian 18. While not specifically shown, step 215 may also include receiving the third signal 20C from the third sensor 14C if a third sensor is present in the system 10, or any number of other sensors (not shown).

At step 220, the first signal 20A is used to determine a first acceleration value, a first displacement value, and a first velocity, and the second signal 20B is used to determine a second acceleration value, a second displacement value, and a second velocity value. At step 225, one of the sensors is designated a primary sensor and another sensor is designated a secondary sensor based on one or more of the values determined above. For example, the first acceleration value and the second acceleration value may be compared, and which ever is greater is designated as the primary signal characteristic, along with the other corresponding characteristics. The second greatest acceleration value and corresponding characteristics may be designated as the secondary signal group. It will be appreciated that characteristic values other than acceleration may be used to determine which sensor is the primary sensor and which sensor is the secondary sensor.

At step 230, a ratio of a secondary acceleration value over or to a primary acceleration value may be calculated as part of selecting a threshold set for determining if the pedestrian protection device 32 should be activated. In another embodiment, a difference between the primary value and the secondary value may be calculated to select the threshold set. Alternately, the velocity values or displacement values of the primary and secondary sensors could be used to determine the ratio or difference. At step 235 in this exemplary embodiment, the ratio is compared to a threshold to estimate where the fascia 16 is being impinged relative to the primary and secondary sensors. The exemplary threshold of 0.5 is generally determined empirically based on test data. If the ratio is not substantially close to one (1.0), for example less than 0.5, then the fascia 16 is likely being impinged at a point that is significantly closer to the primary sensor than the secondary sensor, and so a threshold set appropriate for impact near the primary sensor (e.g. the first and second thresholds) may be suitable, as illustrated in step 240. Contrariwise, if the ratio is substantially close to one (1.0), for example greater than 0.5, then the fascia 16 is likely being impinged at a point between the sensors and not significantly closer to the primary sensor or the secondary sensor, and so another threshold set that can be applied to both the primary signal and the secondary signal may be suitable, for example the third and forth threshold set, as illustrated in step 245.

At step 250, a speed signal 38 may be received from the vehicle speed sensor 36, and the temperature signal 42 may be received from the temperature sensor 40. At step 255, the minimum threshold set and the maximum threshold set may be adjusted based on the vehicle speed and an ambient temperature indicated by the corresponding signals 38 and 42.

At step 260, a variety of tests or comparisons to the threshold sets may be performed to determine that the pedestrian 18 is impinging on the fascia 16. In one embodiment, as illustrated in step 260, a pedestrian 18 may be impinging on the fascia 16 if primary sensor acceleration value is greater than primary minimum acceleration threshold, and primary sensor acceleration value is less than primary maximum acceleration threshold, and primary sensor velocity value is greater than primary min. velocity threshold, and primary sensor displacement value is greater than primary min. displacement threshold, and secondary sensor acceleration value is greater than secondary min. acceleration threshold, and primary sensor acceleration value is greater than secondary acceleration value. If any of these tests or comparisons fails, then a collision with a pedestrian is not indicated, and so the method 200 returns to step 210. It will be appreciated that one or more tests could be added to this exemplary list, and some of the tests removed depending on the flexibility and deflection characteristics of the fascia 16, test results, and/or legal requirements regarding pedestrian size the design of the pedestrian protection device 32

At step 265, the pedestrian protection device 32 is activated or deployed. It will be appreciated that the system 10 may have more than one pedestrian protection device 32 and so may deploy different combinations of the pedestrian protection device 32 depending on the severity of the collision with the pedestrian 18.

Accordingly, a system 10 and a method 200 of activating a pedestrian protection device on a vehicle are provided. Attaching or at least coupling the sensors 14A-C to the fascia 16 provides better sensitivity for detecting a collision with a pedestrian 18 when compared to systems that do not attach or tightly couple the sensors to the fascia 16. Also, since the sensors are positioned more forward relative to the direction of travel 34, collisions are detected earlier and so there is more time to activate or deploy appropriate pedestrian protection devices. The signals 20A-C from the sensors 14A-C are processed such that characteristics are compared to a lesser (first, third, minimum) threshold set and a greater (second, fourth, maximum) threshold set whereby a collision is indicated if the characteristics has values between the lesser threshold and the greater threshold sets. By comparing to a lesser threshold and a greater threshold set, ineffective or inappropriate deployment or activation of the pedestrian protection device 32 may be avoided. By combining the feature of attaching the sensors to the fascia with determining that the signal from at least one sensor is between two thresholds, the system may better detect a collision with a pedestrian and appropriately activates a pedestrian protection device. By making comparisons of various characteristics, the location of a contact with the fascia by a pedestrian may also be determined.

While this invention has been described in terms of the preferred embodiments thereof, it is not intended to be so limited, but rather only to the extent set forth in the claims that follow.

We claim:

1. A system on a vehicle for activating a pedestrian protection device comprising:
   a first sensor coupled to a fascia of the vehicle and adapted to detect a collision with an object and output a first signal;
   a second sensor coupled to the fascia spaced apart from the first sensor, said second sensor adapted to detect a collision with an object and output a second signal; and
   a controller configured to receive the first signal from the first sensor and the second signal from the second sensor, determine a minimum threshold set and a maximum threshold set based on the first signal and the second signal, and activate the pedestrian protection device if either the first signal or the second signal is greater than a threshold of the minimum threshold set and less than a threshold of the maximum threshold set, wherein the controller is further configured to
   determine a first acceleration value, a first displacement value, and a first velocity value based on the first signal, and
   determine a second acceleration value, a second displacement value, and a second velocity value based on the second signal, wherein the controller is further configured such that
   if the first sensor displacement value is greater than the second sensor displacement value, the first sensor is designated as a primary sensor, the first acceleration value is designated as a primary acceleration value, the first displacement value is designated as a primary displacement value, the first velocity value is designated as a primary velocity value, the second sensor is designated as a secondary sensor, the second acceleration value is designated as a secondary acceleration value, the second displacement value is designated as a secondary displacement value, and the second velocity value is designated as a secondary velocity value; and
   if the first sensor displacement value is less than or equal to the second sensor displacement value, the first sensor is designated as a secondary sensor, the first acceleration value is designated as a secondary acceleration value, the first displacement value is designated as a secondary displacement value, the first velocity value is designated as a secondary velocity value, the second sensor is designated as a primary sensor, the second acceleration value is designated as a primary acceleration value, the second displacement value is designated as a primary displacement value, and the second velocity value is designated as a primary velocity value.

2. The system in accordance with claim 1, wherein the system further comprises a third sensor coupled to a fascia spaced apart from the first sensor and the second sensor, and adapted to detect a collision with an object and output a third signal.

3. The system in accordance with claim 2, wherein the controller is further configured to
   set a minimum threshold set equal to a first threshold set and a maximum threshold set equal to a second threshold set if the primary displacement value is substantially greater than the secondary displacement value,
   set a minimum threshold set equal to a third threshold set and a maximum threshold set equal to a fourth threshold set if the primary displacement value is substantially equal to the secondary displacement value, and
   activate the pedestrian protection device when the primary sensor acceleration value is greater than a primary minimum acceleration threshold, the primary sensor acceleration value is less than a primary maximum acceleration threshold, the primary sensor velocity value is greater than a primary minimum velocity threshold, the primary sensor displacement value is greater than a primary minimum displacement threshold, the secondary sensor acceleration value is greater than a secondary minimum acceleration threshold, and the primary sensor acceleration value is greater than the secondary acceleration value.

4. The system in accordance with claim 1, wherein the minimum threshold set and the maximum threshold set are selected based on a ratio of the first signal and the second signal.

5. The system in accordance with claim 1, wherein the minimum threshold set and the maximum threshold set are selected based on a difference of the first signal and the second signal.

6. The system in accordance with claim 1, wherein the controller is further configured to determine the minimum threshold set and the maximum threshold set based also on a vehicle speed and an ambient temperature.

7. The system in accordance with claim 1, wherein one sensor is designated as a primary sensor based on having the greatest acceleration value, and another sensor is designated a secondary sensor based on having the second greatest acceleration value.

8. The system in accordance with claim 1, wherein one sensor is designated as a primary sensor based on having the greatest displacement value, and another sensor is designated a secondary sensor based on having the second greatest displacement value.

9. The system in accordance with claim 1, wherein one sensor is designated as a primary sensor based on having the greatest velocity value, and another sensor is designated a secondary sensor based on having the second greatest velocity value.

* * * * *